May 10, 1966 S. R. HOFSTEIN 3,250,917

LOGIC CIRCUITS

Filed April 12, 1961 3 Sheets-Sheet 1

INVENTOR.
STEVEN R. HOFSTEIN
BY Samuel Cole
ATTORNEY

INVENTOR.
STEVEN R. HOFSTEIN
BY Samuel Cole
ATTORNEY

May 10, 1966 S. R. HOFSTEIN 3,250,917

LOGIC CIRCUITS

Filed April 12, 1961 3 Sheets-Sheet 3

INVENTOR.
STEVEN R. HOFSTEIN
BY Samuel Cole
ATTORNEY 3,250,917
Patented May 10, 1966

3,250,917
LOGIC CIRCUITS

Steven R. Hofstein, Princeton, N.J., assignor to Radio Corporation of America, a corporation of Delaware Filed Apr. 12, 1961, Ser. No. 102,426
15 Claims. (Cl. 307—88.5)

The present invention relates to logic circuits which are useful in data processing equipment. More particularly, the invention relates to unipolar transistor circuits for performing logical inversion or transformation.

In unipolar transistor logic circuits the voltages representing binary digits have different signs at the input and output circuits to the transistor. For example, for a P-type transistor, a binary "one" input may be represented by a voltage $+W_0/3$ and a binary "zero" input by a voltage $+W_0$. The corresponding output voltages from the circuit are $-W_0/3$ for binary "one" and $-W_0$ for binary "zero."

Logical inversion requires that a voltage $-W_0$ be converted to a voltage $+W_0/3$ and a voltage $-W_0/3$ to a voltage $+W_0$. The circuits of the present invention perform this function. In addition, these circuits are simple in that they employ few elements. Moreover, they can be integrated into one stick of semiconductor material. One of the circuits to be discussed has the further advantage that it can be made of the same type of semiconductor material as the preceding and succeeding logic stages. Accordingly, if appropriately topologically arranged, this inverter can be integrated into the same stick of material as the remaining logic circuits.

The inverters of the invention include an input terminal for receiving an input voltage at one of two levels, one representing the binary digit "one" and the other the binary digit "zero." A circuit which includes a unipolar transistor through which a constant current flows is connected at one electrode to said input terminal. An output terminal is connected to a second electrode of the unipolar transistor and it provides output voltages at two levels which are different than the levels of the input terminal. One of these output voltage levels represents the binary digit "zero" when the voltage at the input terminal represents the binary digit "one" and the other of these levels represents the binary digit "one" when the voltage at the input terminal represents the binary digit "zero."

The invention is described in greater detail below and is illustrated in the following drawing of which:

The circuits of the present invention are made up of unipolar transistors, some acting as active elements and some acting as passive elements such as resistors. Such transistors are described in an article by Wallmark and Marcus appearing in the IRE Transactions on Electronic Computers, June 1959, page 98 and elsewhere in the literature. A brief description is given below of the element and certain characteristics of its operation which are important in the present invention.

Figure 1:
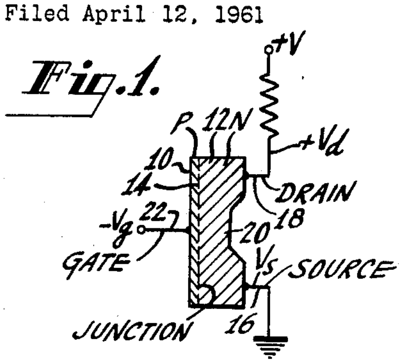
FIG. 1 is a schematic showing of a unipolar transistor.

The unipolar transistor is shown schematically in FIG. 1. The particular one shown includes a P-type region 10 and an N-type region 12 with a PN junction 14 between the two regions. Charge carriers (electrons in the present case) flow from the source electrode 16 through the N-type material of the region 12 to the drain electrode 18. The N-type material includes a portion 20 of restricted cross-section known as the "channel." A gate electrode 22 is connected to the P-type region 10. Voltages applied to the gate electrode 22 change the effective cross-section of the channel 20 thereby altering its impedance and controlling the current flow from the source 16 to the drain 18. For example, in the transistor illustrated, as the voltage $-V_g$ on the gate electrode 22 is made more negative, the drain current flow decreases.

Figure 2:
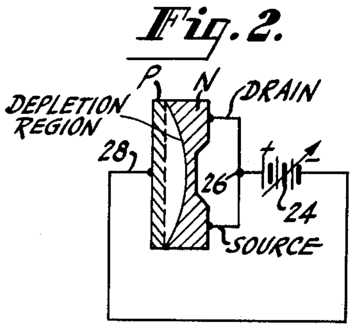
FIGS. 2, 3 and 4 are schematic circuit diagrams to help explain the operation of the unipolar transistor.
Figure 3:
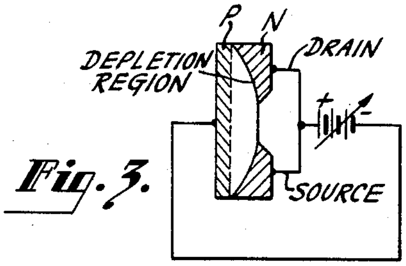

An important parameter in the operation of a unipolar transistor is its pinch-off voltage $P_o$. The pinch-off voltage may be determined in the following manner. The source and drain electrodes are connected together as shown in FIG. 2. An adjustable voltage source shown as a battery 24 is then connected between this common connection 26 and the gate electrode 28 in a sense to reverse bias the gate electrode. As the reverse bias voltage on the gate electrode is increased, the PN junction depletion region moves into the channel as illustrated in FIG. 2 thereby decreasing the effective channel cross-section. As the reverse bias voltage is increased still further, the depletion region moves further across the channel until finally it completely closes off the channel as shown in FIG. 3. The voltage at which the channel just closes off is defined as $P_o$, the pinch-off voltage.

Figure 4:
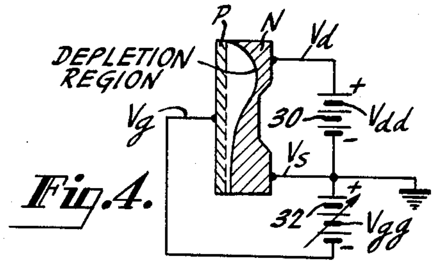

In general, a unipolar transistor is operated with a voltage $V_{dd}$ between the source and drain electrodes as is shown in FIG. 4. This voltage establishes a current in the channel between the source and drain electrodes and it is this current which is modulated by the depletion region depth and hence by the gate voltage $V_{gg}$.

In the showing of FIG. 4, the source voltage $V_s$ is chosen as the reference and accordingly the source electrode is connected to ground. A voltage source, shown as battery 30, is connected between the source and drain electrodes with its positive terminal connected to the drain leectrode. This produces a flow of electrons from the source to the drain. A biasing voltage source, shown as battery 32, is connected between the source and gate electrodes.

As can be seen in FIG. 4, the depletion region is greater at the drain end of the transistor than at the source end. This is because the gate-to-drain voltage $V_g+V_d$ is greater than the gate-to-source voltage $V_g$ and the extent of the depletion region varies along the length of the channel in accordance with the IR voltage drop along the channel.

At some value of gate voltage, the gate-to-drain voltage $V_g+V_d$ will equal the pinch-off voltage $P_o$. At that point, the depth of depletion region causes the channel to pinch-off but only at the drain end of the channel. Although this would seem to indicate that the drain current must immediately go to zero, it has been found that this is not the case; in fact, the current levels off and remains at a constant value essentially independent of any further increase in drain voltage. In other words, the transistor may be said to be at saturation under these conditions. The reason, at least quantitatively, for this phenomenon is not completely known.

Figure 5:
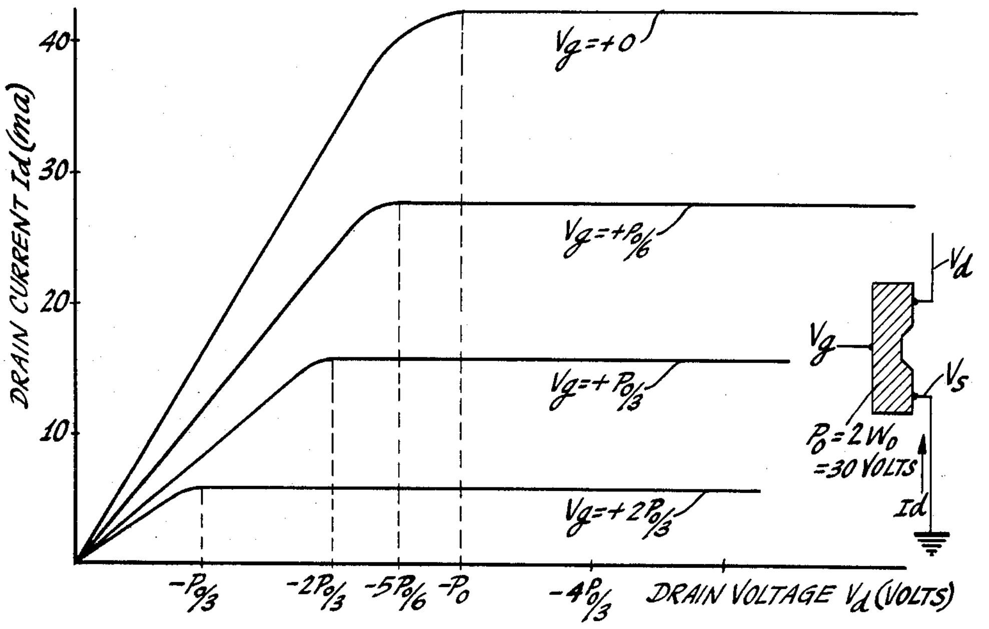
FIG. 5 is a family of characteristic curves of drain current versus drain voltage for a particular unipolar transistor.

The family of curves of FIG. 5 illustrates what is explained above. It may be seen from FIG. 5 that as the drain voltage is increased, the drain current increases until the gate voltage minus the drain voltage is equal to the pinch-off voltage $P_o$. Thereafter, the drain current remains substantially constant. For example, as may be seen from the lower curve legended $V_g=+2P_o/3$, when $V_d$ equals $-P_o/3$, the drain current $I_d$ becomes constant. At that point $V_g-V_d=P_o$, the pinch-off voltage.

The current flow through a unipolar transistor stops when the gate-to-source voltage reaches the pinch-off value thereby closing off the source end of the channel as well as the previously closed drain end of the channel. This is not shown explicitly in FIG. 5 but it may be observed that as $V_g$ approaches $P_o$, that is, as $V_g-V_s$ approaches $P_o$, the drain current gets smaller and smaller.

To summarize the above, when the gate voltage minus the drain voltage $(V_g-V_d)$ is equal to or greater than the pinch-off voltage $P_o$, the current flowing through unipolar transistor is constant. It is further seen from FIG. 5 that the amount of constant current flowing under these conditions depends on the gate-to-source voltage $V_g-V_d$. Further, all current flow through unipolar transistor may be cut-off when both ends of the channel close off, that is, when $V_g-V_s$ is also equal to or greater than $P_o$.

Figure 6:
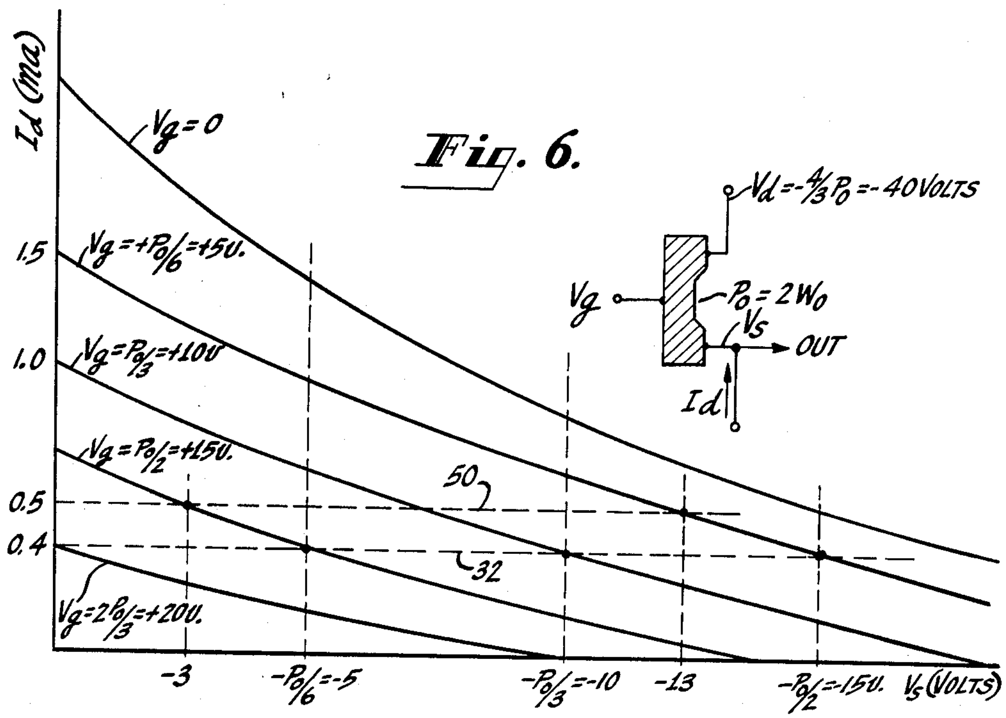
FIG. 6 is a family of characteristic curves of drain current versus source voltage for a particular unipolar transistor.

FIG. 6, wich is a pilot of source voltage $V_s$ versus drain current $I_d$ for different values of gate voltage $V_g$, also illustrates an interesting characteristic of unipolar transistors. The circuit whose characters are plotted is shown above the curves. It may be seen from the curves that equal increments of gate voltage at a given current correspond to equal increments of source voltage. (This has been found to be the case only when the drain voltage is sufficiently high—higher than $P_o$.) For example, if the current is maintained constant at 0.4 milliampere, as indicated by dashed line 32, then a change in gate voltage from +15 to +10 volts corresponds to a change in source voltage from −5 volts to −10 volts. A further change in gate voltage from +10 volts to +5 volts results in a corresponding change in source voltage from −10 volts to −15 volts. This phenomenon is made use of in the circuit of the invention shown in FIG. 7.

In the circuits which follow, the following convention is adopted. The symbols $V_d$, $V_g$ and $V_s$ refer to the drain, gate and source voltages. A unipolar transistor in which the channel region is of a P-type is shown cross-hatched. A unipolar transistor in which the channel is of N-type is shown in the clear. These transistors are referred to as P- and N-type transistors, respectively. Also, as implied in the introduction, a binary "zero" at the input to an N-type transistor is a voltage of value $-W_o$ and a binary "one" input to the same transistor is a voltage of value $-W_o/3$. A binary "one" output of an N-type transistor is a voltage $+W_o/3$ and a binary "zero" output is a voltage $+W_o$. A binary "one" input to a P-type transistor is a voltage $+W_o/3$ and a binary "zero" input to the same transistor is a voltage $+W_o$. A binary "one" output of a P-type transistor is a voltage $-W_o/3$ and a binary "zero" output of the same transistor is a voltage $-W_o$.

A conventional pinch-off voltage to employ with unipolar transistor circuits is $W_o$, where $W_o=15$ volts. (The pinch-off voltage for a unipolar transistor is a function of its channel depth and is designed into the transistor in the manufacturing process.) One such circuit is shown to the left of FIG. 7. It consists of two N-type unipolar transistors 34 and 36 connected in series source-to-drain. A resistor, which may be a unipolar transistor element the gate of which is connected to the source, is shown at 38. These three elements comprise an "and" circuit. When a binary "one" input $-W_o/3$ is simultaneously applied to both transistors, they both conduct and a binary "one" output $+W_o/3$ appears at source electrode 40. If either one of the transistors 34, 36 receive a binary "zero" output, no conduction occurs through transistors 34 and 36, and $+W_o$ corresponding to binary "zero" appears at the output terminal.

One form of logical inverter according to the present invention is shown in the dashed block 42 following the "and" gate just described. This circuit includes a P-type unipolar transistor 44 connected in series with a constant current source 46. The transistor is chosen to have a pinch-off voltage $P_o=2W_o$. The drain electrode 48 is maintained at a sufficiently high negative voltage that the gate-to-drain voltage $V_g-V_d$ is always greater than the pinch-off voltage $P_o$. Under these conditions, the transistor 44 operates at saturation, that is, in its constant current region, as already discussed.

It has already been mentioned that the gate voltage $V_g$ assumes one of the two values $+W_o$ and $+W_o/3$. Accordingly, the drain voltage may arbitrarily be selected to be $-8/3\ W_o$, for example. Under these circumstances, the gate-to-drain voltage is either $11/3\ W_o$ or $3W_o$. The pinch-off voltage $P_o$ for transistor 44 is $2W_o$ and it is therefore seen that the gate-to-drain voltage is always greater than this.

If the current passing through transistor 44 is constant, and the drain voltage is sufficiently high, then a given change in gate voltage corresponds to the same change in source voltage. This may be seen in FIG. 6. The constant current passing through transistor 44 determines the actual value of the source voltage. For example, as can be seen from FIG. 6, dashed line 50, if the current passing through the transistor is 0.5 milliampere, when $V_g=+15$ volts, $V_s=-3$ volts; when $V_g=+5$ volts, $V_s=-13$ volts. The difference between these output voltages is equal to the difference between the binary digits "one" and "zero" but the absolute values of the voltages do not correspond to the binary digits "one" and "zero," respectively. It is therefore necessary to adjust the source 46 to provide a value of current such that $V_s$ assumes the desired values $-W_o/3$ (−5 volts) and $-W_o$ (−15 volts) in response to gate inputs $+W_o$ and $+W_o/3$, respectively. As can be seen from FIG. 6, this value of current is 0.4 of a milliampere.

Figure 7:
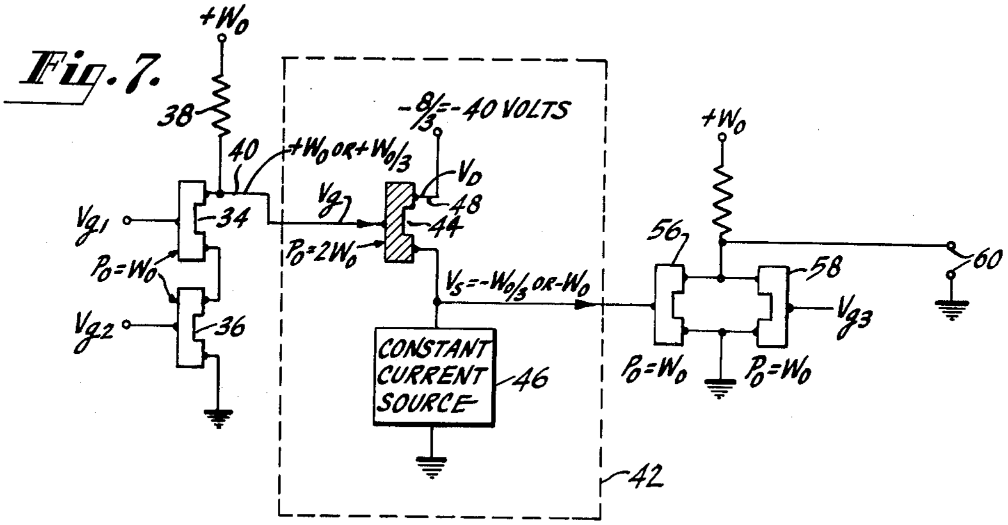
FIG. 7 is a schematic circuit diagram of an "and" circuit, followed by an inverter according to the present invention, followed by an "or" circuit.
Figure 8:
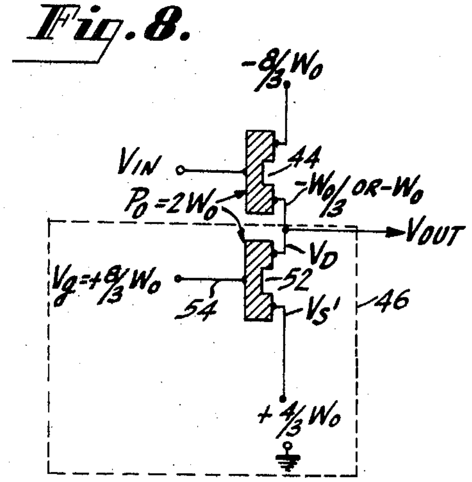
FIGS. 8 and 9 are schematic circuit diagrams of other inverter circuits according to the present invention.

One particularly advantageous way of achieveing a constant current source for the inverter of the invention is shown in FIG. 8. Corresponding reference characters have been applied to corresponding elements in the circuits of FIGS. 7 and 8. The constant current source 46 includes a unipolar transistor 52. As already mentioned, it is desired that the output voltage $V_{out}$ (legended $V_s$ in FIG. 7) vary between values $-W_o/3$ and $-W_o$, This output voltage is the same as the drain voltage $V_d$ for transistor 52. In order to have transistor 52 provide a constant current, its source-to-gate voltage is made greater than the pinch-off voltage. The pinch-off voltage for transistor 52 is $2W_o$, the same as the pinch-off voltage for transistor 44. Accordingly, one may arbitrarily choose some fixed voltage for the gate electrode 54 of transistor 52, such as $+8/3\ W_o$, such that $V_g-V_d$ for transistor 52 is always greater than $2W_o$.

With the two parameters $V_d$ and $V_g$ for transistor 52 chosen as above, transistor 52 conducts a constant current. $V_s'$, the source voltage of transistor 52, is now fixed at a value such that: (a) the source-to-gate voltage for transistor 52 is less than its pinch-off voltage (this permits transistor 52 to conduct); and (b) the magnitude of the current conducted by transistor 52 is the desired one, namely 0.4 of a milliampere. It can be seen from FIG. 5 that when the source-to-gate voltage is $2P_o/3$, then the current conducted is, in fact, 0.4 milliampere. Since $V_g$ has been preset to $8/3W_o$ the source voltage for transistor 52 is made to be $4/3W_o$, so that the source to gate voltage $V_g-V_s$ is in fact $2P_o/3$ $$(8/3W_o-4/3W_o=4/3W_o=2P_o/3)$$

Returning for a moment to FIG. 7, the inverter 42 is shown connected to an "or" gate. The gate is not part of the present invention but is illustrated to show one place in which the inverter may be used. The gate consists of two N-type unipolar transistors 56 and 58 connected in parallel. If either one or both of the transistors 56 and 58 is conducting, the output voltage available at terminals 60 is $W_o/3$. If both transistors are cut-off, the output voltage available is $+W_o$. One input to the "or" gate is the $V_s$ output of transistor 44; the second input is a voltage $V_{g3}$ from another stage, not shown.

It may be observed that the inverter of the present invention, which is made of P-type transistors, is connected between two logic stages made of N-type transistors. It is to be understood, of course, that the inverter can be made of N-type transistors provided appropriate power supplies are employed. In this case, the logic stages at input and output may be made of P-type transistors.

Figure 9:
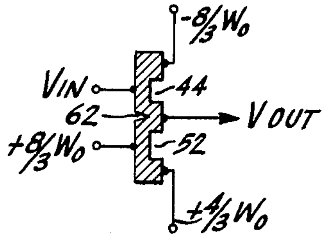

The circuit of FIG. 9 is the same as the one of FIG. 8 but is in integrated form. In other words, the two transistors are formed of a single "stick" of semiconductor material. The source electrode of transistor 54 is common with the drain electrode of transistor 52. The two transistors are effectively isolated from one another with respect to transistor action by the slot 62.

One important advantage of the inverter circuits shown in FIGS. 7 to 9 is that they provide a constant, direct current level shift over a wide range of voltage input and hence provide for exact logical inversion. Furthermore, the absolute values of the output voltages obtained with the inverter can easily be varied by changing the bias provided by the constant current source unipolar transistor. Hence, inversion for signals at levels other than $W_o$ and $W_o/3$ may be attained simply. Further, as is shown in FIG. 9, the two unipolar transistors are substantially identical and can be fabricated from a single stick.

The circuits of FIGS. 7–9 have one disadvantage, namely that they must be fabricated from a material different than the material of the logic stages preceding and following the inverter. As shown in FIG. 7, the transistors of the logic stages are of N-type whereas the transistor of the inverter is P-type. This means that the inverter cannot easily be fabricated into the same stick of material as, for example, the "and" and "or" gates shown.

Figure 10:
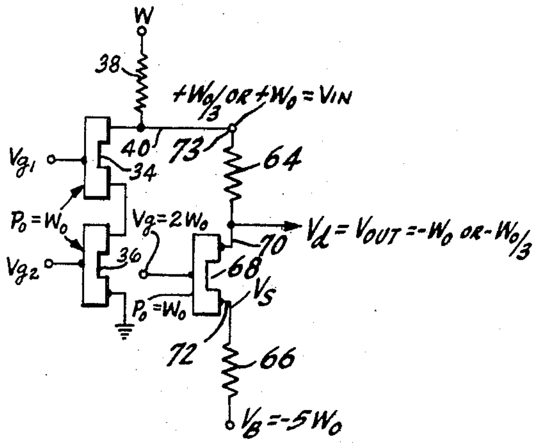
FIGS. 10 and 11 are schematic circuit diagrams of still other inverter circuits according to the present invention.

The circuit of FIG. 10 overcomes the disadvantage above. The circuit consists of two resistors 64 and 66 and a unipolar transistor 68. The three elements are connected in series with resistor 64 connected to the drain electrode 70 and resistor 66 connected to the source electrode 72. The input voltage $V_{in}$ is applied to terminal 73 of the resistor and the output voltage $V_{out}$ is taken from the drain electrode 70.

The input voltage comes from a previous logic stage and may be either $+W_o/3$ or $+W_o$ corresponding to binary "one" and binary "zero," respectively. As already mentioned, such voltages are obtained at the output of N-type unipolar transistors. Transistor 68 is also of N-type. The output voltage desired is $-W_o$ or $-W_o/3$ and these voltages are appropriate for application to following N-type unipolar transistor logic stage (not shown).

In order to obtain the same voltage increment at the output as between voltages $+W_o/3$ and $+W_o$ at the input, the current through transistor 68 is maintained constant. This is achieved by maintaining the gate voltage $V_g$ at a value such that the gate-to-drain voltage always exceeds the pinch-off voltage. The pinch-off voltage for transistor 68 is chosen to be $W_o$. The output voltage desired is $-W_o$ or $-W_o/3$. Accordingly, the gate voltage may arbitrarily be chosen at any negative value equal to or greater in magnitude than $-2W_o$. For the sake of illustration, the value $-2W_o$ is chosen.

The constant current through the transistor 68 is then selected, typically at a value of one-half the maximum possible current. This maximum current corresponds to a gate-to-source voltage of "zero." Resistor 64 is then chosen so that for the given constant current, the voltage across resistor 64 is the desired value for proper inversion of the input signal. For the input signal levels $-W_o$ and $-W_o/3$, this desired voltage is $+4/3\ W_o$, yielding an output of $+W_o/3$ and $+W_o$, respectively. $V_b$ may arbitrarily be chosen at some value substantially greater than several times the pinch-off voltage such as $-5W_o$. Resistor 66 is then chosen so that $V_s$ is of the proper value to yield the desired constant current. The design of the circuit above is such that typical variations in the parameters of transistor 68 are only slightly reflected in variations of the inversion voltage across resistor 64. One reason is the relatively large value of resistor 66. Further, the circuit possesses a high degree of self-compensation in that a change in current or voltage $V_b$ is compensated by a change in voltage $V_s$ in a sense to tend to maintain the current at its former value and $V_d$ constant. These are desirable features in assuring reliability of circuit operation. A further advantage of this type of inverter is that it is fabricated from elements identical to those used in the previous logic circuits, and hence may be incorporated into the same stick of semiconductor material. For example, the input to the circuit may be the output of AND gate 38, 34, 36. This is the same AND gate as is illustrated in FIG. 7 and an explanation of its operations appears in the discussion of FIG. 7.

Employing the values of voltage noted on FIG. 10, and assuming $W_o$ to be 15 volts, a suitable circuit according to FIG. 10 may be designed as follows:

A current is chosen which the transistor can conduct and which is otherwise suitable for the circuit design. The current, for example, may be 0.2 milliamperes. From FIG. 10 it is seen that:

$$R_{64}=\frac{E_{64}}{I} \qquad (1)$$

Substituting numbers and solving:

$$R_{64}=\frac{W_o/3-(-W_o)}{I}=10{,}000 \text{ ohms}$$

It is also seen from FIG. 10 that:

$$IR_{66}=V_b-V_s \qquad (2)$$

and $$IR_{64}=4/3W_o \qquad (3)$$

Dividing 2 by 3 and substituting gives:

$$\frac{R_{66}}{R_{64}}=\frac{|-5W_o-V_s|}{|4/3W_o|} \qquad (4)$$

The value of $V_s$ must fall within $-2W_o$ and $-W_o$ to permit transistor 68 to conduct. Assume the value $-3W_o/2$. Substituing in 4 and solving for $R_{66}$ gives:

$$\frac{R_{66}}{R_{64}}=\frac{|-5W_o+3W_o/2|}{4/3W_o}$$

$$R_{66}=65{,}000 \text{ ohms}$$

Figure 11:
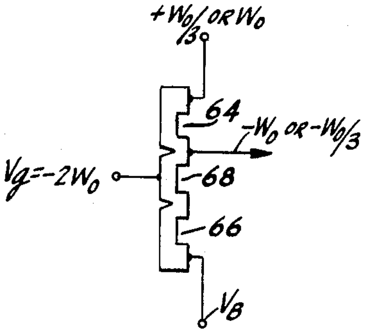

The circuit of FIG. 11 is the circuit of FIG. 10 in integrated form. Similar reference numerals have been applied to similar elements. Note that resistors 66 and 64 are unipolar transistors with no connection to the respective gate electrodes of these transistors. The value of the resistance depends in each case upon the length of the channel region and can be made any practical value desired during the manufacturing process.

What is claimed is:

1. A unipolar transistor circuit comprising an input terminal for receiving an input voltage at one of two levels, one said level representing the binary digit "one" and the other the binary digit "zero"; a circuit including a unipolar transistor connected at one electrode to said input terminal and means for continuously maintaining a constant preset level of current flow through the transistor during the entire period of operation of the transistor; and an output terminal connected to an electrode of said unipolar transistor for providing output voltages at two levels different than the two levels at said input terminal, one representing the binary digit "zero" when the voltage at said input terminal represents the binary digit "one," and the other representing the binary digit "one" when the voltage at said input terminal represents the binary digit "zero."

2. A unipolar transistor circuit comprising an input terminal for receiving an input voltage at one of two levels, one said level representing the binary digit "one" and the other the binary digit "zero"; a circuit including a unipolar transistor connected at one electrode to said input terminal and means for continuously maintaining a constant flow of current through the transistor during the entire period of operation of said transistor; and an output terminal connected to a second electrode of said unipolar transistor for providing output voltages at two levels different than the two levels at said input terminal, one representing the binary digit "zero" when the voltage at said input terminal represents the binary digit "one," and the other representing the binary digit "one" when the voltage at said input terminal represents the binary digit "zero."

3. A unipolar transistor inverter circuit comprising an input terminal for receiving an input voltage at one of two levels, one said level representing the binary digit "one" and the other the binary digit "zero"; a circuit including a unipolar transistor through which a constant current flows connected at one electrode to said input terminal, said connection including a direct current impedance element; a second direct current impedance element connected between another electrode of said unipolar transistor and a source of operating voltage; and an output terminal connected to said one electrode of said unipolar transistor for providing output voltages at two levels different than the two levels at said input terminal, one representing the binary digit "zero" when the voltage at said input terminal represents the binary digit "one," and the other representing the binary digit "one" when the voltage at said input terminal represents the binary digit "zero."

4. An inverter circuit comprising a unipolar transistor having source, drain, and gate electrodes; means for establishing a level of current flow through the transistor which remains at a constant, preset value during the performance by the transistor of the inversion function; an output terminal at one of the source and drain electrodes of said transistor; and means for applying an input voltage indicative of a binary digit to said transistor for shifting the level of the voltage at said output terminal while maintaining the flow of current through the transistor constant at its preset value.

5. An inverter circuit comprising a unipolar transistor having source, drain, and gate electrodes; means including a constant current source for establishing a preset level of current flow through the transistor which remains at a constant value during the inverter operation of the transistor; an output terminal at said source electrode of said transistor; and means for applying an input voltage indicative of a binary digit to said gate electrode for shifting the level of the voltage at said source electrode while maintaining the flow of current through the transistor constant at its preset value.

6. An inverter circuit comprising a unipolar transistor having source, drain, and gate electrodes; means for applying a bias voltage between said gate and source electrodes and an operating voltage between said source and drain electrodes for establishing a preset value of constant current flow through the transistor; an output terminal at said drain electrode of said transistor; and means including a resistor connected between said drain electrode and a terminal to which said operating voltage is applied and a resistor connected to said drain electrode for applying an input voltage indicative of a binary digit to said drain electrode for shifting the level of the voltage at said drain electrode while maintaining the flow of current through the transistor constant at its preset value.

7. An inverter comprising, in combination, a unipolar transistor having source, drain and gate electrodes; means for applying a voltage between the drain and gate electrodes of the transistor of an amplitude greater than the pinch-off voltage for the transistor; means for maintaining the source electrode of the transistor at a voltage level such that current continuously flows through the transistor at a substantially constant value during the performance of the inversion function; and means for applying to one of the gate and drain electrodes of the transistor a voltage indicative of a binary digit.

8. An inverter comprising, in combination, a unipolar transistor; a constant current source in series with the transistor connected to the source electrode of the transistor for continuously maintaining a preset level of current flow through the transistor during the inverter operation; means for applying a reverse bias voltage representing the binary digit "one" or "zero" to the gate electrode of the transistor; means for applying a voltage between the drain and gate electrodes of the transistor at least equal to the pinch-off voltage of the transistor, and in a polarity to enable current flow through the transistor; and an output terminal at the source electrode of the transistor.

9. An inverter comprising, in combination, a first unipolar transistor; a constant current source comprising a second unipolar transistor in series with the first transistor and connected with its drain electrode to the source electrode of the first transistor; means for applying a reverse bias voltage representing the binary digit "one" or "zero" to the gate electrode of the first transistor; means for applying a voltage between the drain and gate electrodes of the first transistor at least equal to the pinch-off voltage of the first transistor and in a polarity to enable current flow through the first transistor; means for continuously applying a fixed level of voltage to the gate electrode of the second transistor of a value such that the drain to gate voltage of the second transistor is always at least equal to the pinch-off voltage of the second transistor for continuously maintaining a fixed level of current flow through the first and second transistors, the source electrode of said second transistor being connected to a reference voltage source; and an output terminal at the source electrode of the first transistor.

10. A logical inverter comprising, in combination, a unipolar transistor having drain, source and gate electrodes operated at a drain voltage such that a given change in gate voltage at a particular value of current corresponds to the same change in source voltage at that current; and means for establishing and continuously maintaining a fixed current flow through said transistor during the inverter operation at a level to produce a desired voltage at said source electrode in response to a given voltage at said gate electrode.

11. An inverter comprising, in combination, a first unipolar transistor having drain, source and gate electrodes operated at a drain voltage such that a given change in gate voltage at a particular value of current corresponds to the same change in source voltage at that current; and means including a second unipolar transistor connected to the first unipolar transistor for establishing and continuously maintaining a fixed current flow through said first transistor during the inverter operation at a level to produce a desired voltage at said source electrode in response to a given voltage at said gate electrode.

12. An inverter comprising, in combination, a unipolar transistor having source, drain and gate electrodes; first and second resistors connected in series with the transistor, the first connected to the drain electrode and the second to the source electrode; means for applying input voltage indicative of binary digits to said drain electrode through said first resistor; means for maintaining said gate electrode at a voltage such that the gate-to-drain voltage exceeds the pinch-off voltage of the transistor; means for applying a voltage to said source electrode through said second resistor at a level to cause said transistor to conduct constant current; and an output terminal at said drain electrode.

13. An inverter comprising, in combination, a unipolar transistor having source, drain and gate electrodes; first and second unipolar transistors connected to act as first and second resistors connected in series with the transistor, the first connected to the drain electrode and the second to the source electrode; means for applying input voltages indicative of binary digits to said drain electrode through said first resistor; means for maintaining said gate electrode at a voltage such that the gate-to-drain voltage exceeds the pinch-off voltage of the transistor; means for applying a voltage to said source electrode through said second resistor at a level to cause said transistor to conduct constant current; and an output terminal at said drain electrode.

14. An inverter as set forth in claim 13 in which the two resistors and the first-mentioned unipolar transistor are integrated into the same piece of semiconductor material.

15. In combination, a logic stage including at least one unipolar transistor having a channel region made of semiconductor material of given conductivity type; and an inverter connected to the logic stage for logically inverting the output signal of said logic stage, said inverter including a unipolar transistor having channel region of the same conductivity type as the first mentioned transistor.

References Cited by the Examiner

UNITED STATES PATENTS

| | | | |
|---|---|---|---|
| 2,744,970 | 5/1956 | Shockley | 307—88.5 |
| 3,100,838 | 8/1963 | Szekely. | |

OTHER REFERENCES

International Solid-State Circuits Conference Digest of Technical Papers (Doucette), Feb. 12 and 13, 1959, p. 54.

ARTHUR GAUSS, *Primary Examiner.*

HERMAN K. SAALBACH, *Examiner.*

J. JORDAN, *Assistant Examiner.*